A. M. BONVICN.
GEARING FOR BICYCLES.
APPLICATION FILED OCT. 11, 1916.

1,217,691.

Patented Feb. 27, 1917.

Inventor
A. M. Bonvicn.

Witnesses

By Victor J. Evans
Attorney

UNITED STATES PATENT OFFICE.

ADOLPH M. BONVICN, OF IRONTON, MINNESOTA.

GEARING FOR BICYCLES.

1,217,691.  Specification of Letters Patent.  Patented Feb. 27, 1917.

Application filed October 11, 1916. Serial No. 125,016.

*To all whom it may concern:*

Be it known that I, ADOLPH M. BONVICN, a citizen of the United States, residing at Ironton, in the county of Crow Wing and State of Minnesota, have invented new and useful Improvements in Gearing for Bicycles, of which the following is a specification.

This invention relates to gearing for bicycles, and it has for its object to produce a simple and improved gearing adapted to be actuated by two independent pedals and from which motion may be transmitted to the driving wheel of the bicycle.

A further object of the invention is to produce a device including two separate gear casings, each having a pedal associated therewith together with spur wheels driven by such pedal, the said gear casings affording bearings for a main transmission shaft carrying a sprocket wheel from which motion may be transmitted to the drive wheel of the bicycle.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Corresponding parts in both figures of the drawing are denoted by like characters of reference.

Figure 1:
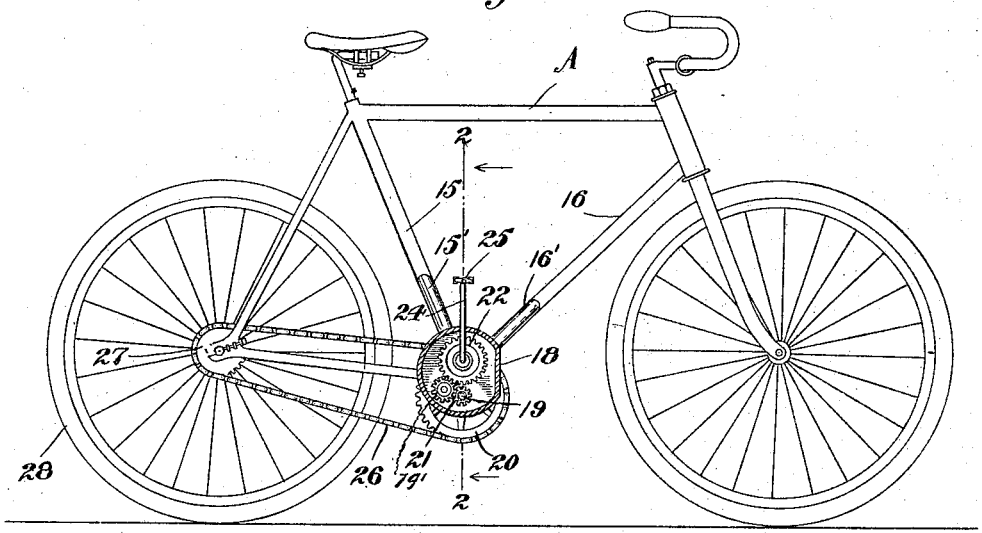
Figure 1 is a view in side elevation of a bicycle having a driving gear constructed in accordance with the invention, parts having been broken away to show the construction more clearly.
Figure 2:
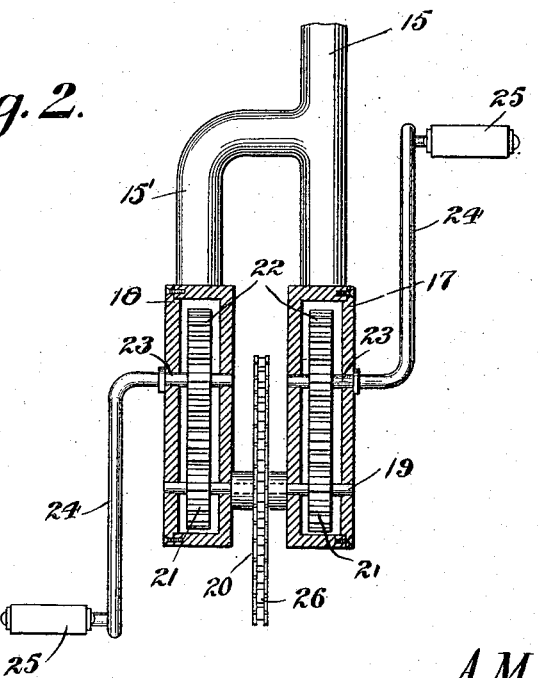
Fig. 2 is a transverse sectional view taken on the line 2—2 in Fig. 1.

The bicycle frame A which is of the customary tubular construction includes two downwardly convergent bars 15, 16 each having an arm connected therewith, as seen at 15', 16', said arms being supported in substantially parallel relation to the bars 15, 16. Two gear casings 17, 18 are provided, the casing or housing 17 being supported by the bars 15, 16, and the casing or housing 18 being supported by the arms 15', 16', said casings or housings being thus supported in approximately parallel relation, but spaced apart. A transmission shaft 19 extends transversely through the lower parts of the casings 17, 18, said transmission shaft carrying a sprocket wheel 20 which is located intermediate the two casings. The shaft 19 also carries pinions 21 of relatively smaller diameter located within the respective casings, said pinions receiving motion through idlers 19' from spur wheels 22 of relatively large diameter which are mounted within the respective casings on counter shafts 23, each of said counter shafts carrying a crank 24 provided with a pedal 25. A transmission chain 26 connects the sprocket wheel 20 with a sprocket wheel 27 on the hub of or otherwise connected with the hind wheel 28 of the bicycle.

By properly proportioning the pinions 21 and the spur wheels 22, it will be obvious that the desired degree of speed may be obtained. The pedal cranks are mounted on independent counter shafts, and the general construction of the device is of such a nature as to insure the desired requirements of power and speed as well as simplicity and durability of construction, neatness of appearance, convenient accessibility for cleaning and other purposes and general utility for the purpose for which the invention is designed.

Having thus described the invention, what is claimed as new, is:—

In a bicycle, a frame having convergent bars provided with arms, casings or housings supported by said bars and arms, a main shaft extending through and supported by the housings, a sprocket wheel mounted on said shaft intermediate the housings, pinions on said shaft within the housings, spur wheels within the housings and transmitting motion to the pinions, and means for driving the spur wheels.

In testimony whereof I affix my signature.

ADOLPH M. BONVICN.

Copies of this patent may be obtained for five cents each, by addressing the "Commissioner of Patents, Washington, D. C."